No. 765,812. PATENTED JULY 26, 1904.
C. J. CARLSON.
SNAP HOOK.
APPLICATION FILED OCT. 2, 1903.
NO MODEL. 2 SHEETS—SHEET 1.

Witnesses
C. Morgan.
F. C. Jones

Inventor
C. J. CARLSON.
By Chandler & Chandler
Attorneys

No. 765,812. Patented July 26, 1904.

UNITED STATES PATENT OFFICE.

CHARLES J. CARLSON, OF OXFORD, MINNESOTA.

SNAP-HOOK.

SPECIFICATION forming part of Letters Patent No. 765,812, dated July 26, 1904.

Application filed October 2, 1903. Serial No. 175,491. (No model.)

*To all whom it may concern:*

Be it known that I, CHARLES J. CARLSON, a citizen of the United States, residing at Oxford, in the county of Isanti, State of Minnesota, have invented certain new and useful Improvements in Snap-Hooks; and I do hereby declare the following to be a full, clear, and exact description of the invention, such as will enable others skilled in the art to which it appertains to make and use the same.

This invention relates to snap-hooks, and has for one of its objects to provide a simple, inexpensive, durable, and efficient hook of the snap variety.

Another object of the invention is to provide a peculiarly-formed hook that will be capable of a lateral or other movement of the hook proper with relation to its mounting.

With these and other objects in view the present invention consists in the combination and arrangement of parts, as will be hereinafter clearly described, illustrated in the accompanying drawings, and particularly pointed out in the appended claim.

Figure 2:
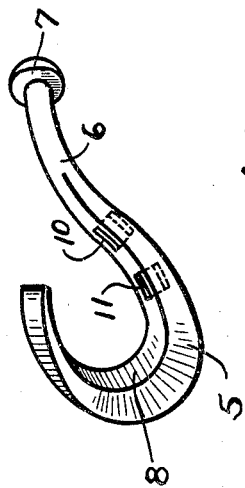
Figure 1:
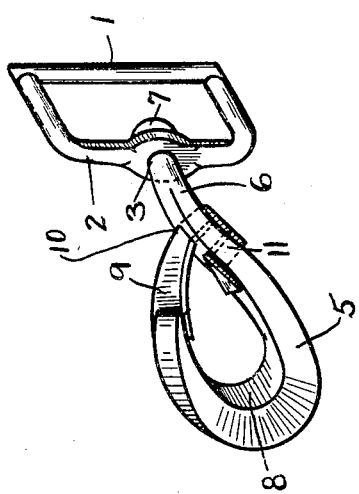
Figure 3:
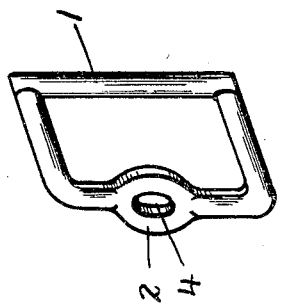
Figure 4:
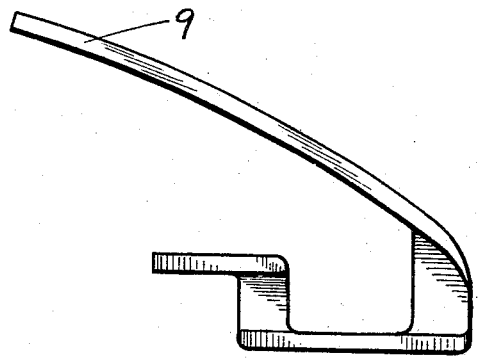
Figure 5:
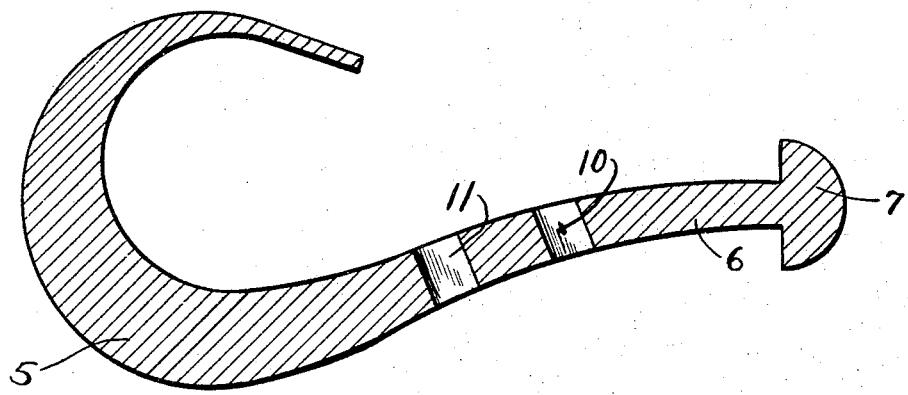

In the drawings, Figure 1 is a perspective view of a snap-hook constructed in accordance with the present invention. Fig. 2 is a detail perspective view of the hook proper, the supporting-loop being detached. Fig. 3 is a detail perspective view of the loop. Fig. 4 is a plan view of the spring carried by the hook proper; and Fig. 5 is a section through the shank of the hook, illustrating the openings for reception of the spring carried thereby, the spring being not shown.

Referring now more particularly to the drawings, the reference character 1 designates the strap-receiving loop and is provided with a curved front cross-bar 2, which is flattened or otherwise enlarged intermediate its ends and centrally perforated, as indicated by the numerals 3 and 4, respectively. In the present instance the hook proper, which is indicated by the character 5, is formed separately from the loop, the shank portion 6 having its free end fitted loosely into the central opening or perforation 4 of the loop and then upset at 7 or otherwise fitted thereto. It will thus be seen that the hook is in swiveled engagement with its supporting-loop 1. The shank portion 6 of the hook is of smaller cross-sectional dimension than the hook proper, which is flattened or otherwise enlarged at 8, producing a broad flat bearing-surface for the support of the ring or other connection to which it may be snapped into engagement.

The tongue of the present device is in the form of a flat spring 9, which is reduced at one end that it may be inserted downwardly through the inclined oblong opening 10 of the shank and then passed upwardly through the oppositely-inclined oblong opening 11, arranged slightly in advance of the first-mentioned opening. It will thus be seen that the spring-tongue 9 is carried by the shank portion of the hook in such manner as to give in movement therewith with its free broad end in contact with the under surface of the extreme free end of the hook, thereby enabling the free and easy insertion of a ring or other connection (not shown) and locking the same within the hook, as well understood. It will thus be seen that the spring is not riveted to the shank, but that owing to its peculiar mounting it is frictionally engaged and secured within said oblong openings, the openings being of a size to snugly receive the reduced end of the spring. It is obvious, however, that the spring may be riveted to the shank within the openings, if desired.

It is to be understood that I do not propose to limit myself to the precise construction and arrangement herein illustrated and described, but that I consider myself entitled to changes in form, size, proportion, materials, and minor details so long as I do not depart from the spirit of my claim.

I claim—

In a snap-hook, the combination with the loop having its front bar enlarged and perforated, of a hook having its shank swiveled in the perforated enlarged portion of the said front bar, the shank having transverse oblong openings therein and a flat spring having a reduced end portion which is made to pass downwardly in the opening nearest to the swiveled end of the shank and upwardly in the second of the said openings, the free end of the said spring being in engagement with the under face of the free end of the hook.

In testimony whereof I affix my signature in presence of two witnesses.

CHARLES J. CARLSON.

Witnesses:
C. O. ANDERSON,
GUSTAF ANDERSON.